UNITED STATES PATENT OFFICE.

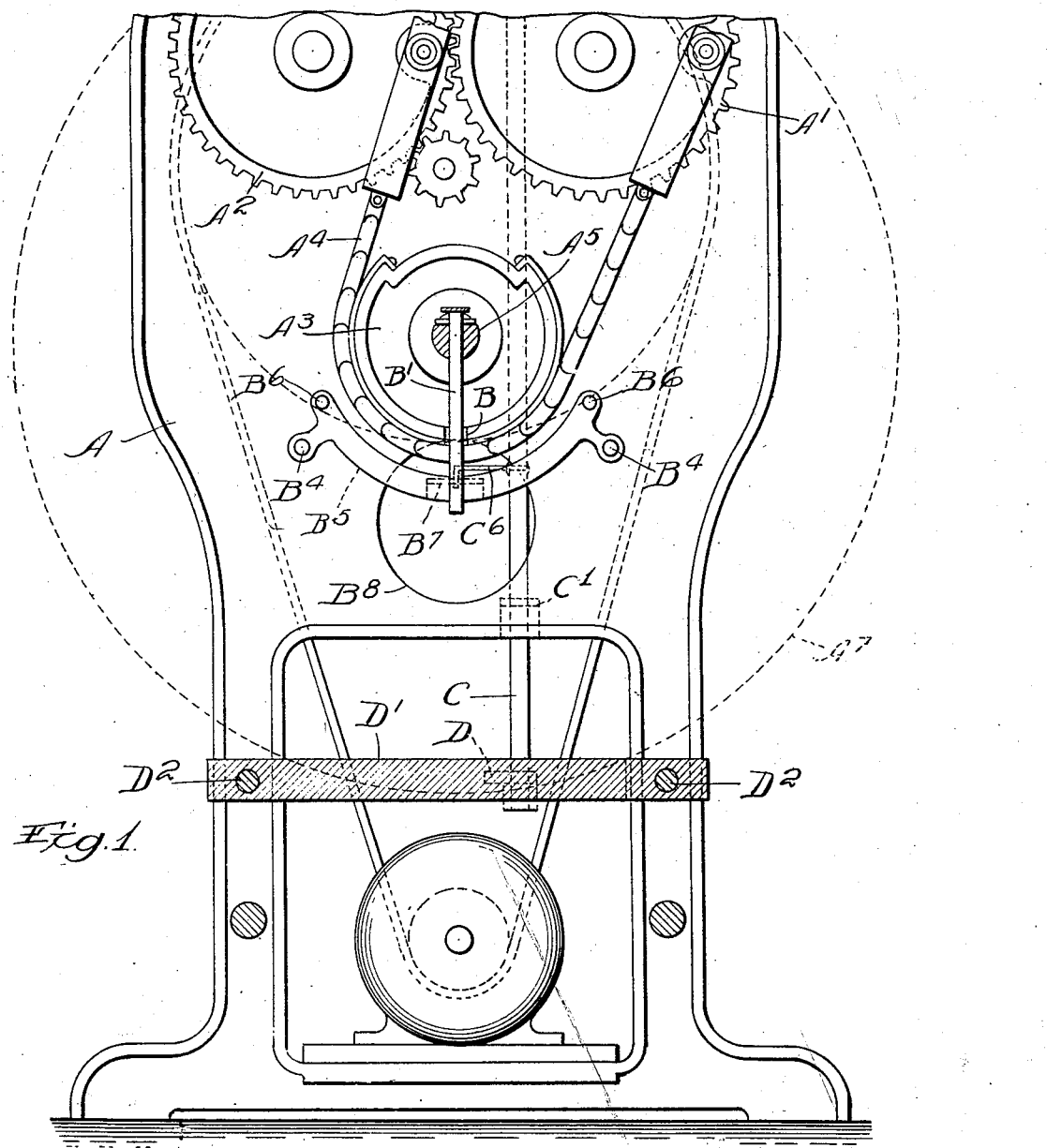

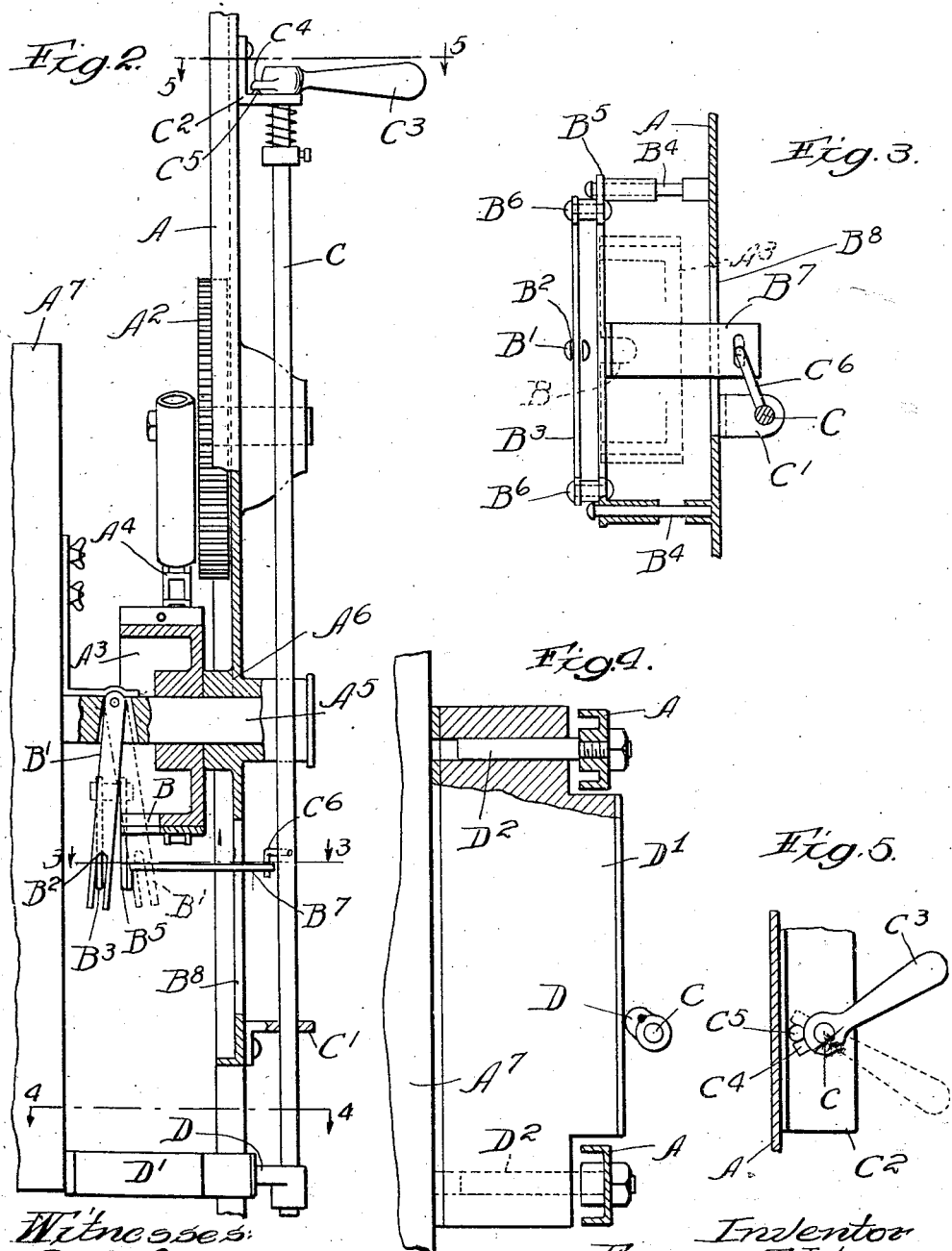

FRANCIS T. JOHNSON, OF CHICAGO, ILLINOIS.

CLUTCH AND BRAKE MECHANISM.

1,213,203.  Specification of Letters Patent.  Patented Jan. 23, 1917.

Original application filed June 7, 1915, Serial No. 32,525. Divided and this application filed February 21, 1916. Serial No. 79,534.

*To all whom it may concern:*

Be it known that I, FRANCIS T. JOHNSON, a citizen of the United States, residing at Chicago, in the county of Cook and State of Illinois, have invented a certain new and useful Improvement in Clutch and Brake Mechanism, of which the following is a specification, being a divisional application of No. 32,525, Francis T. Johnson, washing-machine, filed June 7, 1915.

My invention relates to improvements in clutch and brake mechanism, such as are particularly adapted for use in connection with washing machines and the like.

I have illustrated my invention as applied to washing machines wherein the tub is of the oscillatory type, though of course it would be quite obvious that the mechanism might be employed in other connections.

One object of my invention is to provide a clutch which can be used to effect a discontinuous connection between an oscillating driving member and an oscillating driven clutch.

Another object is to provide the combination between a clutch for driving an oscillating tub and a brake for arresting its movement, in such way that whenever the brake is disengaged the tub will be arrested at whatever position it may at that time be occupying.

Other objects will appear from time to time in the specification.

It is illustrated in the accompanying drawings, wherein—

Figure 1 is a front elevation with parts in section and parts broken away of a washing machine tub showing my drive applied. Fig. 2 is a side elevation in part section of a part of the washing machine on an enlarged scale, showing an assembly of clutch, brake, driving mechanism and control. Fig. 3 is a section along line 3—3 of Fig. 2. Fig. 4 is a section along line 4—4 of Fig. 2. Fig. 5 is a section along line 5—5 of Fig. 2.

Like parts are indicated by like characters in all the figures.

A is an end frame adapted to support a washing machine or other similar mechanism. It carries the two driving wheels $A^1$, $A^2$, and an oscillating segment $A^3$. This oscillating segment is driven by the rotation of the gears $A^1$, $A^2$, operating through a link chain $A^4$ wound partially around the oscillating member, and anchored at either end upon one of the gears $A^1$, $A^2$.

$A^5$ is a shaft rotatably mounted on the bearing $A^6$ on the frame A, and it carries an oscillating member or tub $A^7$. The driving oscillating drum $A^3$ is rotatably mounted upon the shaft $A^5$. The oscillating member $A^3$ is slotted as at B. The shaft $A^5$ carries a clutch arm $B^1$ pivoted therein but held against rotation thereabout. This clutch arm is free to rock in a radial plane into and out of engagement with the slot B. Its lower end is forked or slotted as at $B^2$ to engage a controlling segment $B^3$. This segment is slidably supported at its end on the pins $B^4$ so that it may drive toward and from the oscillating drum.

$B^5$ is a carriage connected to the part $B^3$ by the pins $B^6$, and $B^7$ a controlling member projecting outwardly therefrom through the aperture $B^8$ in the frame A.

C is a control rod vertically disposed mounted in bearings $C^1$, $C^2$ on the front side of the frame A. It has a controlling handle $C^3$. This handle has a stop engaging member $C^4$ adapted to engage the button $C^5$ on the bearing $C^2$.

$C^6$ is a lever engaging the part $B^7$ so that a rotation of the member C will cause the quadrant to move back and forth to move the clutch into and out of engagement with the oscillating drum.

D is a cam mounted on the shaft C adjacent its lower end. This cam is adapted to engage the brake block $D^1$, which block is slidable on the pins $D^2$, toward and from the lower side wall of the tub $A^7$ adjacent its periphery. The position of the cam and the lever $C^6$ is such that when the rod is rotated to throw the clutch into the operative position, it will also disengage the brake, when the rod is rotated to throw the clutch into the inoperative position, the brake will be caused to engage the lower wall of the tub and bring it to rest.

It will be evident that while I have shown in my drawings an operative device, still many changes might be made both in size, shape and arrangement of parts without departing materially from the spirit of my invention, and I wish, therefore, that my drawings may be regarded as in a sense diagrammatic.

The use and operation of my invention are as follows:—With the parts as shown, the tub or other part which is to be driven or oscillated, is driven when the lever is moved so that it engages the oscillating drum, and is found in the position shown in dotted lines. At this point the brake will be out of engagement with the tub, and the oscillation of the drum caused by the rotation of the two driving gears in unison delineated, which drive the chain or loop, and thus the drum will cause the tub to oscillate in the usual manner. When the operator wishes to stop the tub he shifts the lever and slips the clutch arm out of engagement with the drum. Owing to the quadrant arrangement, it will be evident that this drum may be disconnected from the clutch arm at any time, no matter what the position of the parts, but when the operator makes this movement, he also brings the brake into engagement with the tub. It is obvious, of course, that the force applied by the brake will depend upon the pressure exerted by the operator in rotating the control shaft. If he merely rotates enough to just disengage the clutch arm, the brake will be hardly if any applied, but an ordinary full movement will of course apply the brake with full strength and bring the tub to rest permitting the oscillating drum to continue its oscillation without affecting the tub, holding the tub in position.

I claim:

1. A power transmission comprising a shaft, a clutch arm mounted for rotation in a plane containing the axis of the shaft, but held against rotation about the shaft, a drum and means for rotating it, and means for thrusting said arm in engagement with the drum to complete the driving connection, said means comprising a guide plate always in engagement with the lever independent of its position, and means for moving the plate to and from the drum.

2. A clutch comprising a slotted driving drum, a driven member and a clutch arm pivoted thereon and means for rotating said arm to shift it out of and thrust it into the slot in the drum, said means comprising a pair of curved fingers in slidable rotatable relation with the end of the clutch arm, said fingers being substantially concentric with the driving drum.

3. The combination with a rotary washing machine tub of a rotary driving member, a clutch arm carried thereby, and means for throwing it into and out of operative engagement with the rotary member, a brake member adapted to engage the tub, and means responsive to the clutch operating means for throwing the brake member into engagement with the tub when the clutch arm is out of engagement with the driving means.

4. The combination with a shaft mounted for oscillation of a clutch arm carried thereby held against rotation thereabout and free to swing in a radial plane with respect to the shaft, a driving segment and means for oscillating it, its periphery being at one point slotted to engage the arm, and means for swinging said arm into and out of engagement with said slot to connect and disconnect the driving and the driven part.

5. The combination with a shaft mounted for rotation of a clutch arm carried thereby held against rotation thereabout and free to swing in a radial plane with respect to the shaft, a driving segment and means for rotating it, its periphery being at one point slotted to engage the arm, and means for swinging said arm into and out of engagement with said slot to connect and disconnect the driving and the driven part, a driven member carried by the shaft, a brake adapted to be thrust against the driven member, and a connection between the brake and the clutch lever swinging mechanism to cause engagement of the brake when the lever is swung out of the operative position.

6. A driving and brake mechanism for washing machine tubs and the like, comprising a shaft upon which the tub is mounted, a clutch arm mounted for rotation on the shaft in a radial plane and held against rotation about the shaft, a rotating slotted member and means for driving it, a control shaft and means responsive to its manipulation for throwing the clutch arm into and out of engagement with the slot, and for throwing the brake out of and into engagement with the tub.

7. A power transmission device comprising a longitudinally slotted shaft, a clutch arm pivoted in such slot and held by pivot connection against rotation about the axis of the shaft, a clutch drum mounted for rotation on the shaft and slotted, means for thrusting the clutch arm into and drawing it out of engagement with the slot in the drum, and comprising a segment concentric with the drum, means for moving it along a line parallel with the axis of the shaft, the end of the clutch arm being slotted to engage the segment.

In testimony whereof, I affix my signature in the presence of two witnesses this 14th day of February, 1916.

FRANCIS T. JOHNSON.

Witnesses:
MINNIE M. LINDENAU,
ELLA THIEME.